United States Patent

Kazecki et al.

[11] Patent Number: 5,844,943
[45] Date of Patent: *Dec. 1, 1998

[54] METHOD AND CONVERTER FOR CONVERTING RECTANGULAR SIGNALS TO PHASE SIGNALS

[75] Inventors: Henry L. Kazecki, Arlington Heights; John Diehl, Elmhurst; Steven H. Goode, Barrington, all of Ill.

[73] Assignee: Motorola, Inc., Schaumburg, Ill.

[*] Notice: The terminal 2 months of this patent has been disclaimed.

[21] Appl. No.: 259,806

[22] Filed: Jun. 15, 1994

[51] Int. Cl.[6] ............................... H04L 5/12; H04L 23/02
[52] U.S. Cl. ..................... 375/261; 375/279; 375/339; 329/304
[58] Field of Search ....................... 375/261, 269, 375/324, 340, 320, 279, 280, 281, 329, 331, 332; 329/304; 327/100

[56] References Cited

U.S. PATENT DOCUMENTS

| | | | |
|---|---|---|---|
| 4,509,017 | 4/1985 | Andren et al. | 375/324 |
| 4,674,105 | 6/1987 | Suzuki | 375/324 |

*Primary Examiner*—Stephen Chin
*Assistant Examiner*—Hai H. Phan
*Attorney, Agent, or Firm*—Randall S. Vaas

[57] ABSTRACT

A rectangular to phase converter (201) includes a first converter circuit (201B) which limits signals to a predetermined level. A phase selector (259) selects a relative phase from the limited signals. According to one aspect of the invention, input rectangular coordinate signals are mapped to the first quadrant in a first quadrant mapping circuit (201A) before the first quadrant signals are limited and the relative phase signal is returned to the original quadrant by an original quadrant mapping circuit (260).

40 Claims, 6 Drawing Sheets

METHOD AND CONVERTER FOR CONVERTING RECTANGULAR SIGNALS TO PHASE SIGNALS

FIELD OF THE INVENTION

The present invention pertains to converters which convert rectangular signals to phase signals.

BACKGROUND OF THE INVENTION

Phase modulation is employed by communications equipment including cellular radiotelephones, modems, and a variety of other devices. Phase shift keying (such as quadrature phase shift keying) and amplitude modulation (such as quadrature amplitude modulation) are two examples of modulation techniques utilized in communication equipment. These techniques use rectangular signals and phase signals, and often employ circuitry for converting between rectangular and phase signals.

More particularly, $\pi/4$ quadrature phase shift keyed modulation ($\pi/4$ QPSK) is used for cellular radiotelephone systems. The signal constellation of the originating data transmitted by a cellular radiotelephone is represented by the space diagram shown in FIG. 4. This diagram includes an in-phase axis I and a quadrature axis Q. Each data point on the space diagram can be identified using either a rectangular coordinate signal pair or a phase signal and a magnitude signal. The rectangular coordinate signal pair for each data point includes a Q axis coordinate and an I axis coordinate corresponding to the data point. The phase signal includes an angle from the I axis, which is between 0° and 360° and a magnitude signal, which is the straight line length between the origin O and the data point.

In cellular systems, the rectangular coordinates are communicated between transceivers, however, phase information is used by a receiver to reproduce the original signal. For example, an analog voice signal detected by a radiotelephone microphone is encoded and converted to rectangular signals, which are communicated through the cellular system to a receiving transceiver. The receiver in the receiving transceiver converts the received rectangular signals to phase signals. A signal processor utilizes the phase signals to generate a signal which drives a speaker to output the audio signals corresponding to the original signal. Thus, the transceiver converts the rectangular signals to phase signals.

One known circuit used to convert I and Q rectangular signal pairs to phase signals uses two stages. In the first stage, the Q signal is divided by the I signal to generate a quotient. The second stage employs a ROM to calculate the phase from the quotient. However, this requires a very large circuit to generate the quotient, and a read only memory (ROM) addressed by the quotient to generate the angle.

Another known conversion circuit employs a large ROM storing the phase of each data point at which signals may be received at a respective location in the memory. Because the signal is corrupted during transmission, received data may be located anywhere in the space diagram, and not just at the original locations of the transmitter data which are shown in FIG. 4. Accordingly, the memory must store the phase of all the data points which may be represented by the eight bit signal pairs. The input I and Q coordinate signal pair addresses the large ROM to identify a particular data point, and the ROM outputs the phase corresponding to that data point. Although this later conversion circuit eliminates the complex division circuitry employed by the first mentioned conversion circuit, the later circuit requires a significantly larger ROM (e.g., where the I and Q signals each have eight bits and the phase signal is represented by N bits, the ROM required is 64 K X N).

Thus, a difficulty encountered when implementing rectangular signal to phase signal converters in devices such as radiotelephone receivers is that these converters require large circuits with high gate counts. It is, however, desirable to reduce the circuit resources allocated to the rectangular to phase converter so that these resources can be utilized for another circuit operation or eliminated.

A need therefore exists for a rectangular signal to phase signal converter which requires fewer integrated circuit resources (i.e., requires fewer gates).

DETAILED DESCRIPTION OF THE PREFERRED EMBODIMENTS

A rectangular signal to phase signal converter generates phase signals from rectangular signals input thereto. A first converter circuit converts rectangular signals which are below a predetermined threshold to signal levels exceeding the threshold level. A relative phase selector circuit generates a phase output signal from the rectangular signals output by the first converter. The rectangular to phase converter may also advantageously employ a quadrant converter circuit, to convert negative rectangular signals to positive rectangular signals, which is coupled between the input of the rectangular to phase converter and the first converter circuit. By generating the phase output signal from rectangular signals having a value above the threshold level, the conversion circuit complexity is significantly reduced, permitting a system employing the converter to take full advantage of circuit savings achieved by operating on the phase of the signal.

Figure 1:
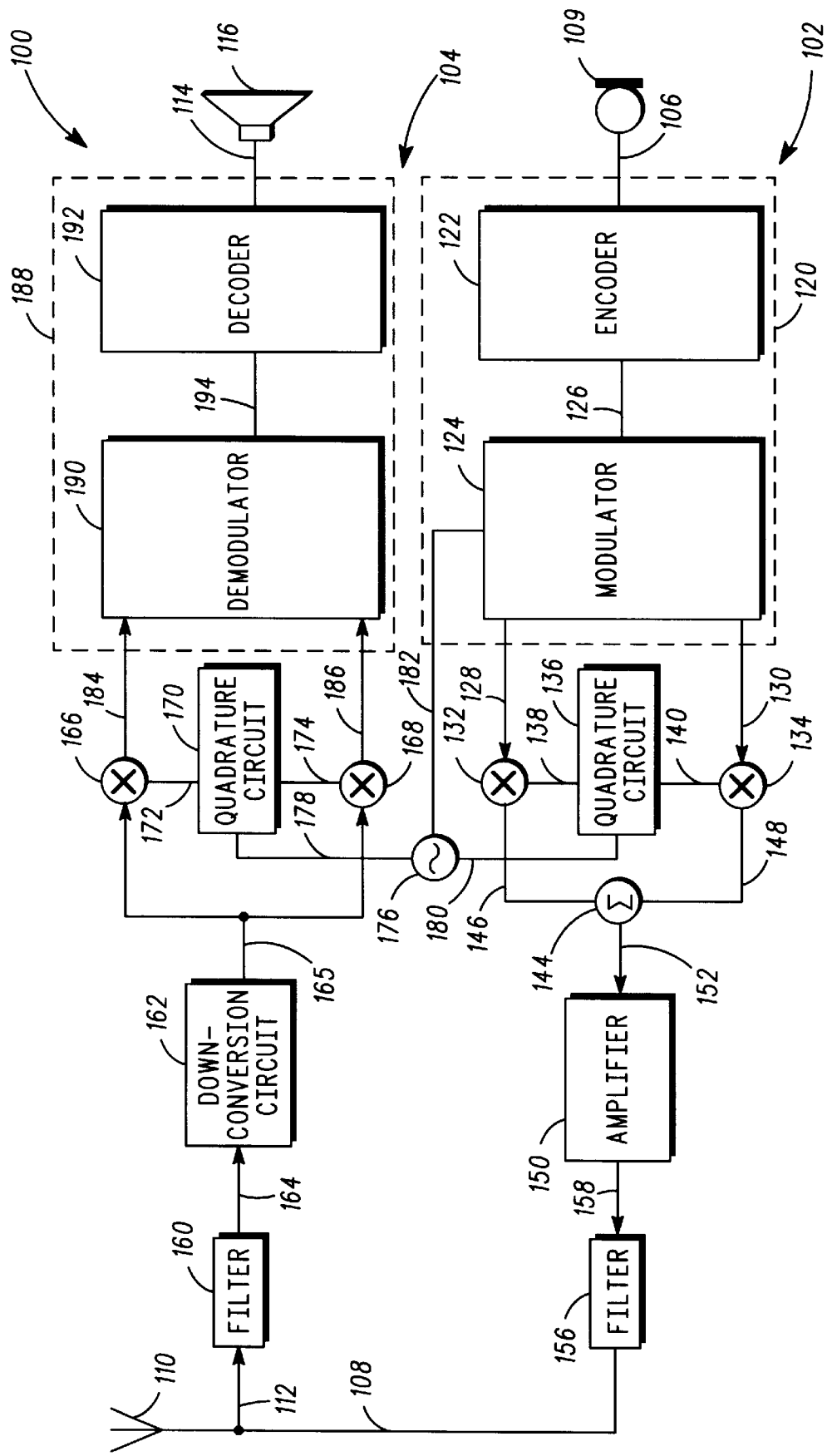
FIG. 1 is a circuit schematic in block diagram form illustrating a transceiver incorporating a converter according to the present invention.

Referring to FIG. 1, a rectangular signal to phase signal converter embodying the present invention may be advantageously employed in a radio frequency (RF) $\pi/4$ quadrature phase shift keyed modulation ($\pi/4$ QPSK) cellular telephone transceiver 100. Transceiver 100 includes a transmitter 102 and a receiver 104. The transmitter 102 is connected between a transmitter input 106, at which electronic signals are input, and a transmitter output conductor 108 which carries modulated signals to antenna 110. The receiver 104 is connected between a receiver input conductor 112, connected to antennae 110, and an electronic signal output 114 at which electronic signals are output. In the illustrated embodiment, transmitter input 106 is connected to a microphone 109, which converts audible sound to electrical signals in a conventional manner, and receiver output 114 is connected to a speaker 116, which converts electrical signals into audible sounds. The transceiver 100 communicates with other similar transceivers via antenna 110.

Figure 4:
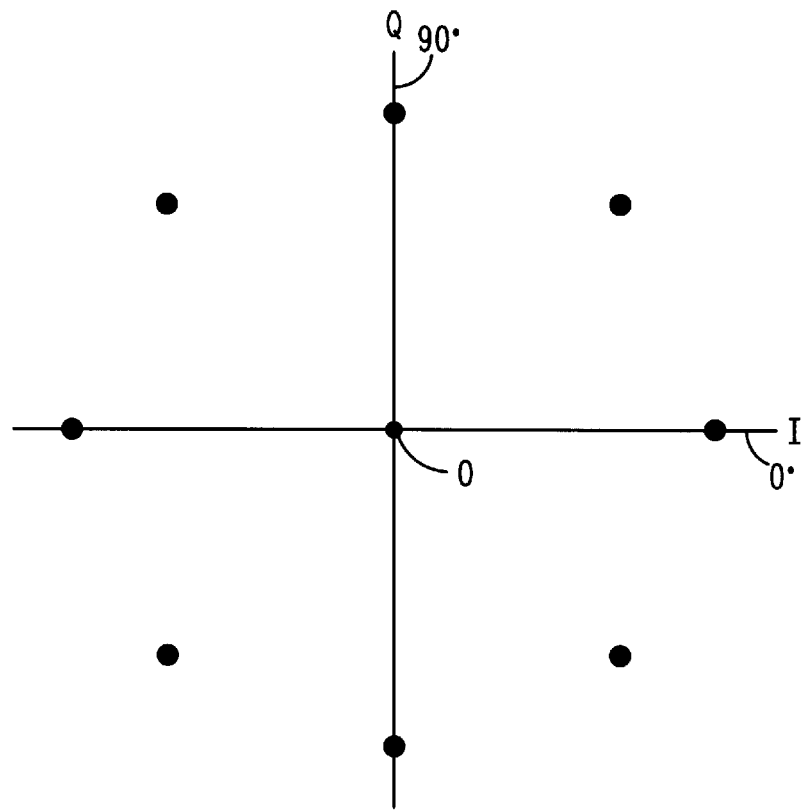
FIG. 4 is a diagram illustrating data points in a constellation of the type with which the present invention may be utilized.

The transmitter 102 includes a digital signal processor 120 having an encoder 122 connected to a modulator 124 by a conductor 126. The encoder and modulator convert the electrical signals at input 106 into digital I and Q signals. One modulator output is connected to a first input of mixer 132 through conductor 128 to supply the I signal thereto. Another modulator output is connected to the first input of mixer 134 through conductor 130 to supply the Q signal thereto. The I and Q signals are the coordinates of data points shown in FIG. 4 to be transmitted through antenna 110. The second inputs of mixers 132 and 134 are connected to respective outputs of quadrature circuit 136 through conductors 138 and 140, respectively. Quadrature circuit 136 generates respective signals on conductor 138 and 140 which are 90° out of phase, such that the signals input to circuit 136 are in phase quadrature with one another. Hence, the mixed signals output by mixers 132 and 134 each have a pair of sidebands, and the sidebands of mixer 132 are at 0° and 180° phase relationship relative to the sidebands generated by mixer 134.

The outputs of mixer 132 and 134 are connected to summer 144 through conductors 146 and 148, respectively. Summer 144 generates a summed signal at the output thereof which is input to amplifier 150 via conductor 152. Amplifier 150 amplifies the summed, modulated signal. The output of amplifier 150 is connected to filter 156 through conductor 158. Filter 156 filters the amplified signals and produces an output signal on conductor 108 for transmission via antenna 110.

The receiver 104 includes a filter 160 connected to antenna 110 through input conductor 112. Filter 160 filters the signal input through antenna 110. The filtered output of filter 160 is connected to down conversion circuit 162 through conductor 164. The down conversion circuit 162 reduces the frequency of the filtered signal. The output of the down conversion circuit is supplied to a first input of mixers 166 and 168 through conductor 165. The second inputs of mixers 166 and 168 are connected to respective outputs of quadrature circuit 170 through conductors 172 and 174, respectively. Quadrature circuit 170 outputs signals on conductors 172 and 174 which are 90 degrees out of phase. Quadrature circuits 136 and 170 include clock oscillators, which are phased locked to reference oscillator 176, which oscillator signal is input to these quadrature circuits via conductors 178 and 180. The modulator 124 also includes an internal timing circuit connected to oscillator 176 through conductor 182. I and Q signals are output from the mixers 166 and 168 on conductors 184 and 186, respectively, connected to a digital signal processor 188. Digital signal processor 188 includes a demodulator 190 connected to a decoder 192 by a conductor 194. The demodulated signal is decoded in decoder 192, and the decoded signal is supplied to speaker 116 via output 114.

Figure 2A:
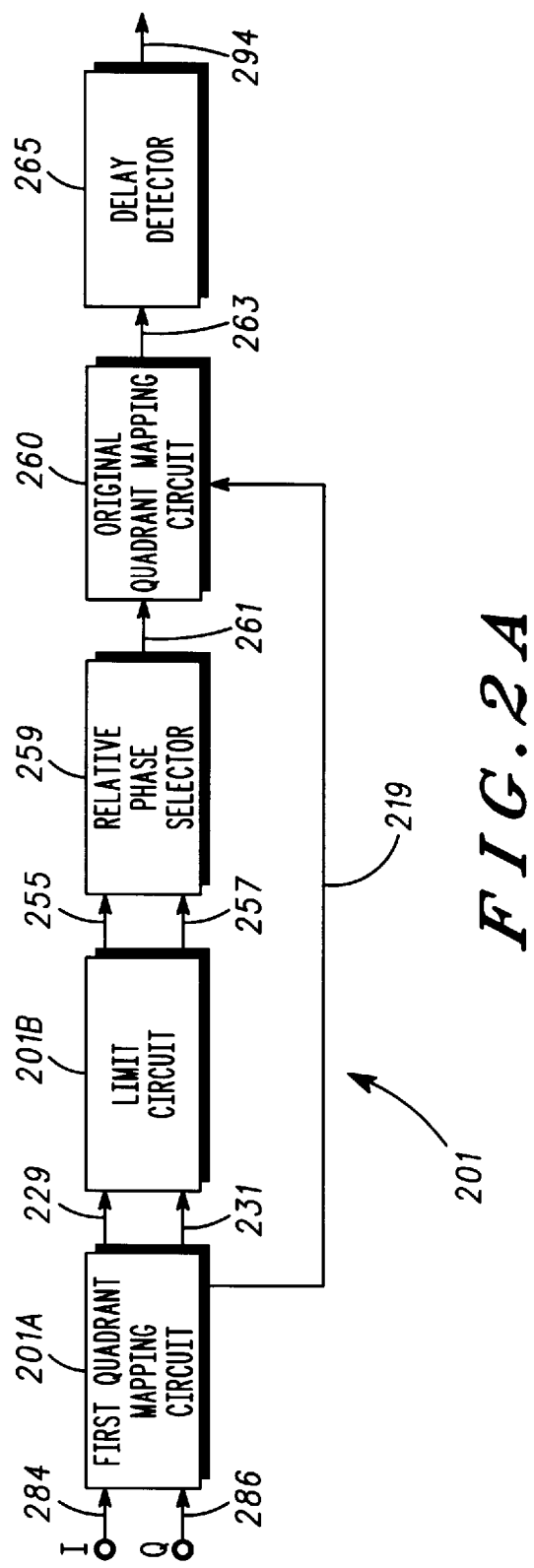
FIGS. 2a and 2b are circuit schematics in block diagram form illustrating a rectangular signal to phase signal converter embodying the present invention.

Having briefly described an environment in which the immediate invention may be advantageously employed, a rectangular to phase converter 201 embodying the present invention will now be described with reference initially to FIG. 2a. The rectangular to phase converter 201 is provided in digital signal processor 188 (FIG. 1). The rectangular to phase converter 201 (FIG. 2a) includes a first quadrant mapping circuit, or quadrant converter, 201A connected to conductors 284 and 286, which correspond to conductors 184 and 186 in FIG. 1. The same components in different drawing figures have the same last two digits and the first digit identifies the figure number. Quadrant converter 201A maps those input signals, which are not in the first quadrant, into the first quadrant. The outputs of the first quadrant mapping circuit 201A are I and Q signals on data busses 229 and 231, which are input to a limit circuit 201B. Quadrant identification information is also output on data bus 219 connected to original quadrant mapping circuit 260. Limit circuit 201B limits input signals such that they have at least a predetermined threshold level by increasing the value of those signals which are below the threshold level. The rectangular limit signals are input to a relative phase selector 259, which generates a relative phase signal between 0° and 90° from the rectangular limit signals on busses 255 and 257. The output of the relative phase selector 259 is connected to an original quadrant mapping circuit 260 through bus 261. Original quadrant mapping circuit 260 maps the relative phase back to the original quadrant of the data input to First Quadrant Mapping Circuit 201A. The output of the mapping circuit 260 is connected to a delay detector 265 through a bus 263.

Figure 2B:
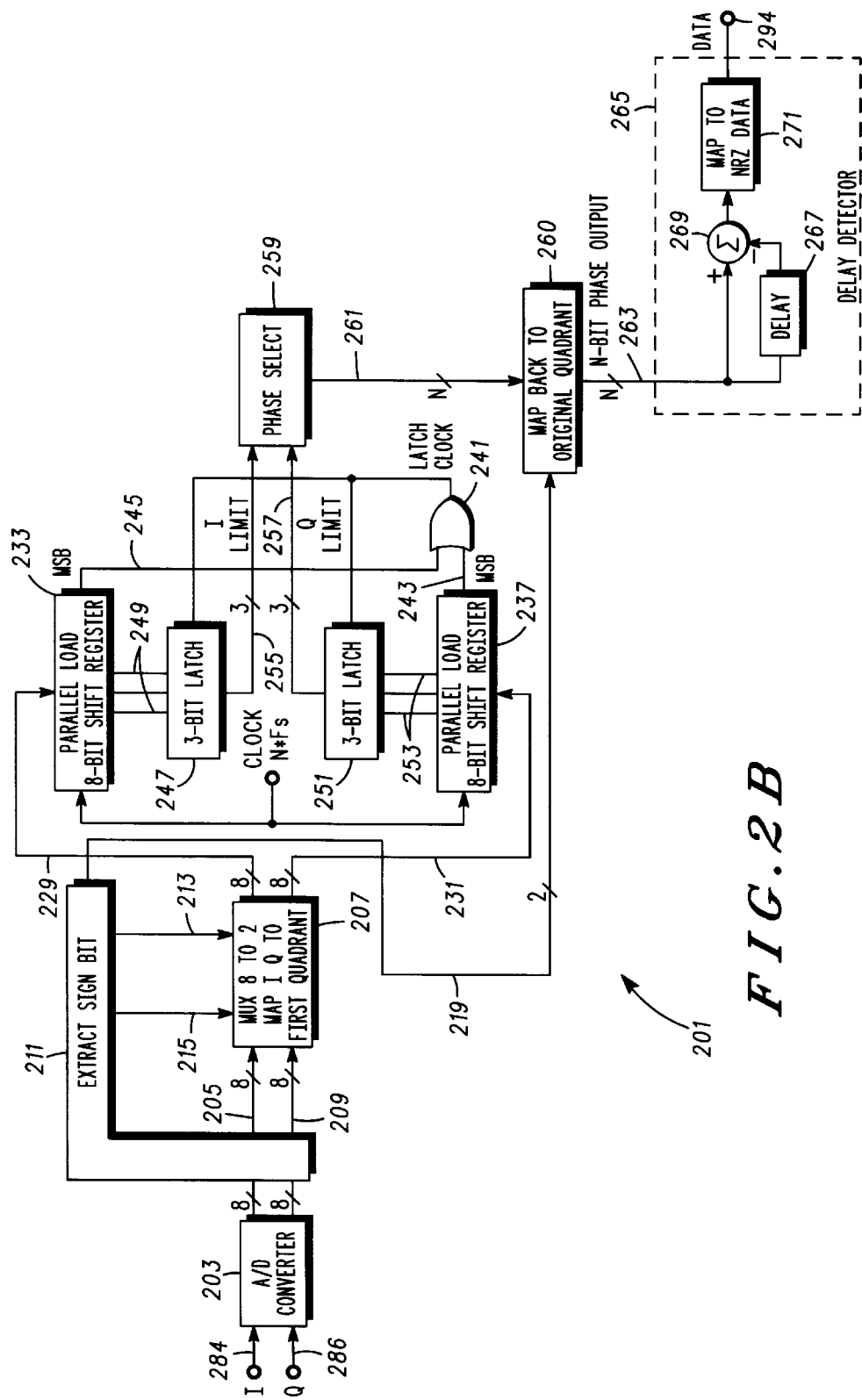

With reference now to FIG. 2b, the rectangular to phase converter 201 includes an analog to digital (A/D) converter 203 connected to the outputs of mixers 166 and 168 to receive the I and Q signals thereat. The I output of the A/D converter 203 is connected to a first input of an eight-to-two multiplexer (mux) 207 via eight conductor data bus 205. The Q output of the A/D converter 203 is connected to mux 207 via eight conductor data bus 209. A sign bit extracting circuit 211 connects the sign bits of the I and Q busses 205 and 209 to the selector control inputs of mux 207 though conductors 213 and 215. The quadrant information represented by these bits is supplied to a regenerating circuit 260 via bus 219. The mux 207 and sign bit extractor 211 affect a first converter which converts negative rectangular signals to positive rectangular signals and thus outputs signals in the positive I and Q quadrant (i.e., the first quadrant).

Figure 3:
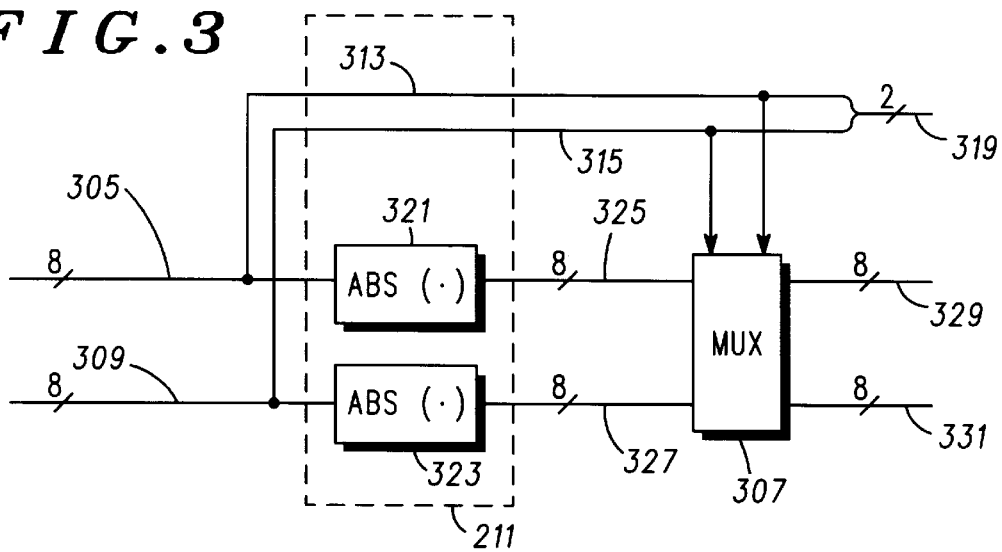
FIG. 3 is a circuit schematic in block diagram form of a converter used in the rectangular signal to phase signal converter according to FIG. 2b.

A sign bit extractor 311 (FIG. 3) includes conductors 313 and 315, which connect the input I and Q sign bits to control inputs of mux 307. The I signal from A/D converter 203 is connected to the input of an absolute value block 321 via conductor 305. Likewise, the Q signal from A/D converter 203 is connected to the input of absolute value block 323 via conductor 309. The absolute value operation is such that the I and Q signals output from the mux are always positive.

The sign bits on conductors 313 and 315 extend into bus 319 connected to regenerating circuit 260, such that the quadrant regenerator 260 outputs a phase signal in the correct quadrant, after a relative phase is calculated, as described in greater detail herein below.

The mux 307 (FIG. 3) connects the mux I input bus 325 and the mux Q input bus 327 to the mux I output bus 329 and the mux Q output bus 331 according to the sign bits on conductors 313 and 315, and thus according to the quadrant of each received rectangular coordinate pair. If the I and Q sign bits on conductors 313 and 315 are both 0, indicating that the received signal is in the positive quadrant, the I input bus 325 is connected to the I output bus 329 and the Q input bus 327 is connected to the Q output bus 331. If only one of the I and Q sign bits is 0, the I input bus 325 is connected to the Q output 331 and the Q input bus 327 is connected to the I output bus 329. The mux thus switches the I and Q signals if only one of the I and Q signals on conductors 313 and 315 is negative. If the I and Q sign bits are both 1, indicating the I and Q signals are both negative, input busses 325 and 327 are connected to the output busses 329 and 331, respectively.

A limit circuit, connected to the output of the quadrant converter, converts rectangular signals below a minimum threshold to a level above the minimum threshold. The limit circuit includes a parallel load eight bit shift register 233 (FIG. 2b) connected to the eight bit I output bus 229. The limit circuit also includes a parallel load eight-bit shift register 237 connected to eight bit Q data bus 231. The most significant bit in the I shift register 233 is connected to a first input of an ORgate 241 through conductor 245. The most significant bit of Q shift register 237 is connected to the second input of ORgate 241 through conductor 243. The three most significant bits of shift register 233 are connected to a three bit latch 247 through three conductor data bus 249. The three most significant bits of shift register 237 are connected to latch 251 through three conductor data bus 253. Each of the parallel load eight bit shift registers 233 and 237 are connected to a clock signal which has a clock operating at a rate of N* Fs, wherein Fs is the A/D sampling frequency of A/D converter 203, and N is the number of bits in the phase signal output by phase regenerator 260.

Figure 5:
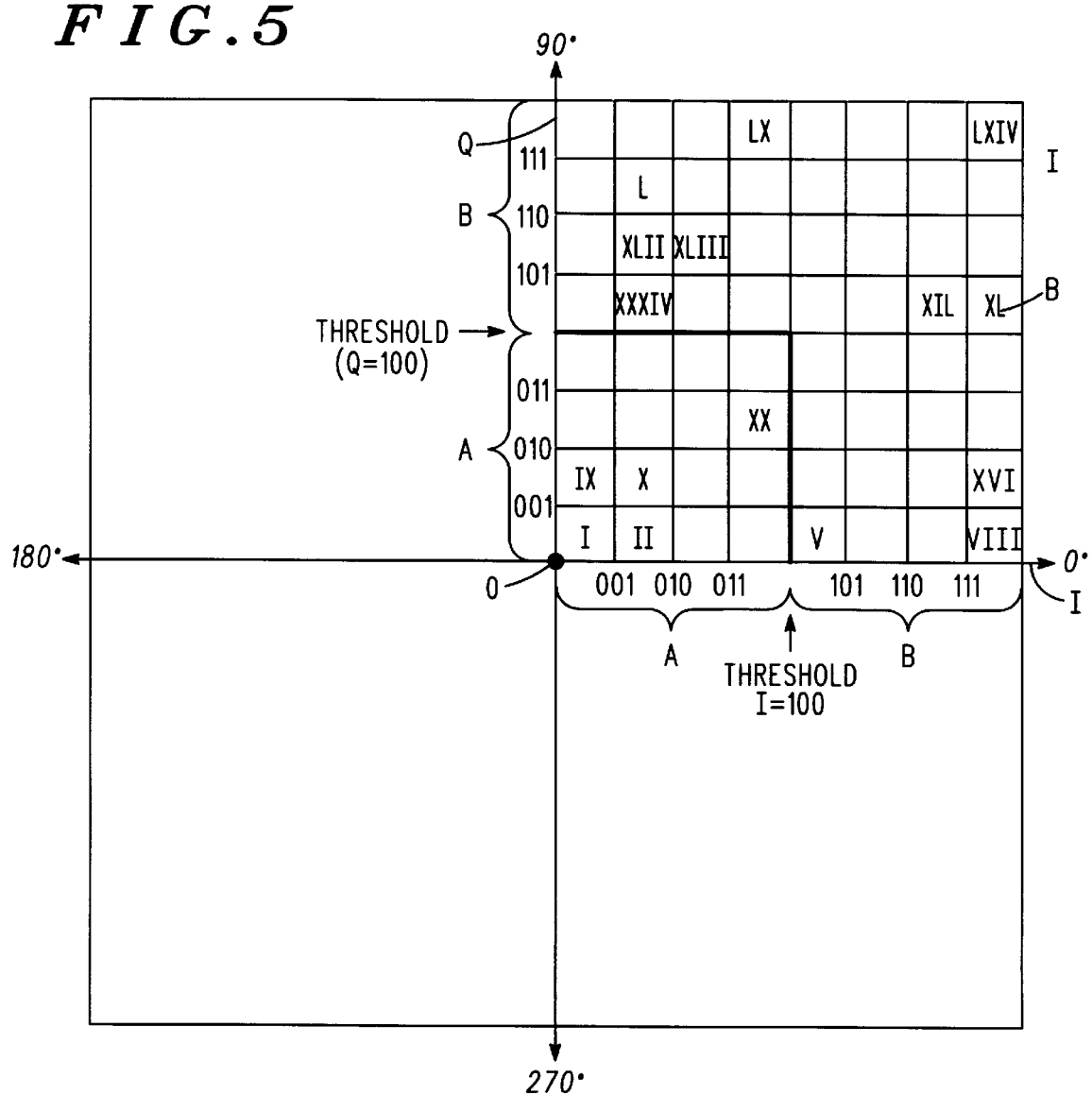
FIG. 5 is a diagram illustrating signals in the phase converter according to the present invention.

The clock signal input to shift registers 233 and 237 affects shifting of words in each shift register by one bit until ORgate 241 detects that the most significant bit (MSB) of at least one of the shift registers is a logic one (a high logic level). Each shift doubles the value of the I and Q signals. When the most significant bit of at least one of the shift registers is a logic one, the data point will be in sector B (FIG. 5). When the most significant bit is zero, the data point will be in sector A. Once the I or Q signal's MSB is a logic one, the output of ORgate 241 locks latches 247 and 251. The signals locked in latches 247 and 251 are the I limit and Q limit signals used to select the relative phase in a relative phase converter, including phase selector 259. A logic circuit (not shown) can determine when the I and Q signals have been shifted through all eight bits by shift registers 233 and 237 without detecting a one. When this occurs, a non zero value can be substituted for the zero levels of the I limit and Q limit signals.

It will be recognized that the limit circuit extracts P consecutive bits from each rectangular signal. Where P is three, the limit circuit breaks the positive quadrant into sixty four subsectors, which are illustrated in FIG. 5. For example: subsector i is represented by I limit 000 and Q limit 000, and includes data points where I and Q are between 00000000 and 00001111; subsector ii is represented by I limit 001 and Q limit 000, and includes data points where I is between 00010000 and 00011111 and Q is between 00000000 and 00001111; subsector ix is represented by I limit 000 and Q limit 001, and includes data points where I is between 00000000 and 00001111 and Q is between 00010000 and 00011111; and subsector xvi is represented by I limit 111 and Q limit 001, and includes data points where I is between 001110000 and 001111111 and Q is between 0001000 and 00011111.

It will also be recognized that the limit circuit extracts the P bits from the I and Q signals such that the most significant bit of at least one of the P bit I limit and Q limit signals is a one. This affects an increase in the value of those I and Q signals in sector A (FIG. 5), increasing these values to move them into sector B. More particularly, the P bits are extracted from the same bit positions in the I and Q rectangular signals, and the bit position selected depends upon where the most significant logic one is located in the two signals comprising the rectangular coordinate signal pair. Thus, the I limit and Q limit signals are selected such that they include the most significant logic one of the rectangular signal pair. For example, where each signal of the input signal pair includes L bits, each of the I limit and Q limit rectangular coordinate signals includes P bits, L is equal to eight, and P is equal to three, then:

if I=00000010 and Q=00000101 (sector i), then I limit= 010 and Q limit=101 (sector xliii); and if I=00110010 and Q=00100000 (sector xx) then I limit= 110 and Q limit=100 (sector xil).

Thus, data points whose rectangular signals are below the predetermined threshold, which are data points whose I and Q signals are both less than 01000000 (the first bit is a sign bit), are increased in value, to map the input signals to a new quadrant. The I limit and Q limit rectangular coordinate signals produced by such mapping are in different subsectors than the input rectangular signals.

A relative phase selector selects a relative phase signal from the I limit and Q limit rectangular coordinate signals output from the limit circuit. The relative phase selector includes a phase selector 259 and a quadrant regenerator 260. The phase selector includes a circuit which outputs a phase signal responsive to the I limit and Q limit signals. The following equation is implemented in this circuit:

$$\text{phase}=(\pi/4)(I-Q)(2-I-Q)+(\pi/4)$$

wherein I is the P bit I limit signal, Q is the P bit Q limit signal, and "phase" is a relative angle having N bits and being between 0° and 90°.

Figure 6:
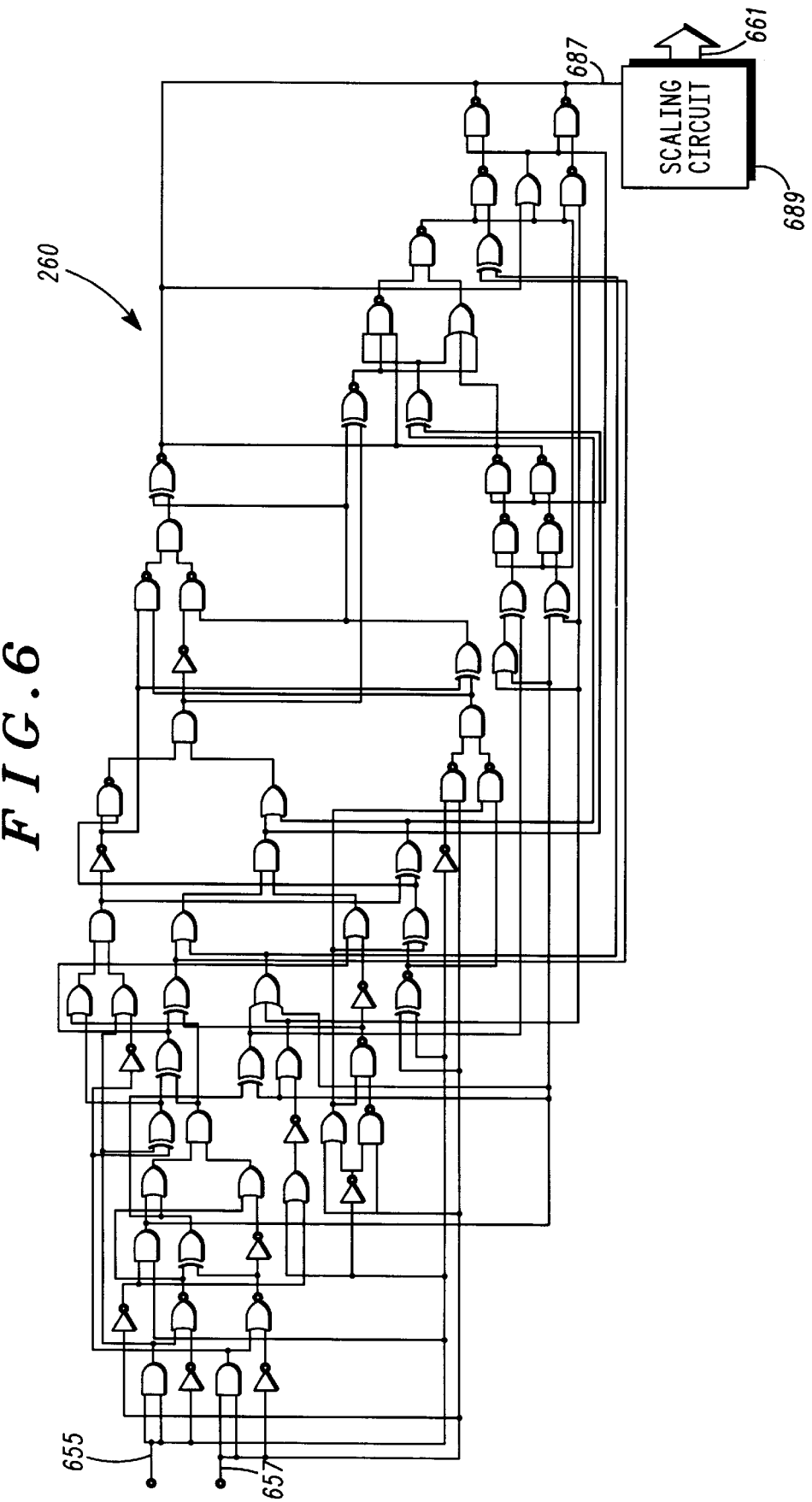
FIG. 6 is a circuit schematic illustrating one embodiment of a phase selector in the circuit according to FIGS. 2a and 2b.

A Boolean logic circuit is shown in FIG. 6 which is one circuit for reducing the equation (I−Q)(2−(I+Q)) to practice. The I Limit signal is input on bus 655 and the Q Limit signal is input on bus 657. A three bit signal is output on bus 687. This output signal is further processed in a scaling and addition circuit 689, which scales the Boolean logic output by multiplying the output by $\pi/4$ and adding $\pi/4$ to the result. The output of the scaling circuit is the relative phase, which is applied to bus 661. This illustrated embodiment is advantageous because it uses a relatively small number of gates. The relative phase selector could alternately be implemented using an arithmetic logic unit (ALU). The Boolean logic circuit is not described in greater detail herein below, being self explanatory.

According to an alternate embodiment of the invention, the phase selector 259 is implemented using a ROM (not shown), which is addressed by the P bit I limit and Q limit rectangular coordinate signals on buses 255 and 257. The ROM stores unique phase signals having a value between 0° and 90° and uniquely identified by the I and Q limit values. The ROM outputs an N-bit phase signal. For the three-bit I and Q signals, a 48 X N ROM is used.

It is also envisioned that a 2×2 mux may be used to select the phase P is equal to two. The four I and Q bits select the phase angle output by the selector.

It will be recognized that the number of bits, P, in the I limit and Q limit signals may be more than three. Using more bits increases the precision of the angle calculation. However, it also increases the complexity, or size, of the phase selector. Applicant's discovered that using three bits for the I limit and the Q limit signals for eight bit I and Q rectangular signals is effective for reproducing voice signals in a radiotelephone transceiver.

The original quadrant regenerating circuit 260 converts the phase signal output by selector 259 to the original quadrant of the I and Q coordinate signals output by the A/ID converter 203. The sign information which was removed by the sign bit extractor 211 is used to implement this operation. More particularly, circuit 260 is implemented using an arithmetic logic unit. If the I and Q coordinates are both positive, the phase signal of the regenerator output is equal to the relative phase output by the phase selector. If the I coordinate is negative and the Q coordinate is positive, the phase signal output of the quadrant regenerator has 90° added to the relative phase output by the selector. If I and Q are both negative, the output of the quadrant regenerator has 180° added to the relative phase output by the phase selector. If I is positive, and Q is negative, the phase signal output by the quadrant regenerator has 270° added to the relative phase output by the phase selector.

The angle information output by the original quadrant converter's quadrant regenerator 260 is the phase signal corresponding to the rectangular signal coordinates output by A/D converter 203. The phase signal is input to a conventional delay detector 265. In the illustrated embodiment, the conventional delay detector 265 is connected to quadrant regenerator 260 via bus 263. Delay detector 265 includes delay circuit 267, a summer 269, and a mapping circuit 271, which in the illustrated embodiment is a nonreturn-to-zero data mapping circuit. The mapped data is output at 294 for decoding in decoder 192 (FIG. 1).

In operation, the illustrated embodiment includes an A/D converter which converts the I and Q modulated signals into eight bit digital representations. The eight bit representations include sign bits which identify the quadrant of the data point represented by the coordinate pairs. A first quadrant converter, including sign bit extractor 211 and mux 207, maps signals in the second, third, and fourth quadrants into the first quadrant. This eliminates three quadrants, to simplify phase signal processing.

Once the signals are mapped into the first quadrant, a limit circuit maps any signals below a threshold level to a value above the threshold level. The threshold level is represented by the dark line in FIG. 5 which separates sector A from sector B. The shift registers 233 and 237 are operated to move the signals out of sector A into sector B, doubling the value of these signal values until the I or Q signal exceeds the threshold. The threshold is exceeded when the MSB in one of registers 233 and 237 has a logic one level. This moves data in sector A (FIG. 5), adjacent the origin, into sector B, remote from the origin. A logic circuit, implemented by ORgate 240, detects when the MSB of one of the shift registers is a logic one (is in sector B), and latches 247 and 251 hold the limit values until the next I and Q signals are input from the A/D converter 203.

The I and Q limited rectangular coordinate signals output by latches 247 and 251 are limited binary representations of the phase of the signal. The illustrated embodiment has three bits for each phase identifier, allowing a 48 X N ROM to be utilized to generate the phase signal, or the following equation:

$$\text{phase} = (\pi/4)(I-Q)(2-I-Q) + (\pi/4).$$

The equation uses only multipliers and adders (adding negative numbers) since $\pi/4$ is constant. This significantly reduces the complexity of the circuit relative to prior art rectangular to phase converter circuits.

The relative phase output by the phase selector 259 will have a value between 0° and 90°. This angle is returned to the quadrant of the signal output from A/D converter 203 by original quadrant mapping circuit 260. The signal is then processed by detector 265.

The method of converting negative rectangular signals to positive rectangular signals, extracting P bits, and calculating the angle, is repeated for each coordinate pair input on conductors 284, 286.

Accordingly, it can be seen that a converter is disclosed which converts rectangular signals to phase signals for operation in the phase domain. The converter provides a significant reduction in circuit complexity. This reduction in complexity results in the significantly lower gate count for a circuit implementing the phase converter. Because systems which operate on rectangular signals are significantly more complex than signals operating on phase signals, a significant circuit savings can be achieved by performing phase operations. However, prior art systems utilize very complex circuits to convert from rectangular signals to phase signals. The gate savings achieved by the converter according to the immediate invention allows the circuit to take full advantage of the savings achieved by operating in the phase domain, thereby achieving a significant reduction in the complexity of the overall system.

Although transceiver 100 is illustrated in a cellular telephone, it will be recognized that the invention may be advantageously employed in other devices including transceivers for modems. Additionally, the phase identifier may be employed in transmitters or receivers, or any other device in which operation in the phase domain is advantageous. Further, it will be recognized that the rectangular signal to phase signal converter can be implemented in a microprocesser.

We claim:

1. A rectangular signal to phase signal converter having an input to receive input rectangular signals, the rectangular signal to phase signal converter comprising:

a limit circuit coupled to the input to receive input rectangular signals therefrom and to generate corresponding rectangular limit signals, the limit circuit selectively increasing values of input rectangular signals which are below a predetermined threshold level; and a phase selector coupled to the limit circuit to receive rectangular limit signals output thereby, and to select a phase signal corresponding to the rectangular limit signals output by the limit circuit.

2. The rectangular signal to phase signal converter as defined in claim 1, further including a first quadrant mapping circuit coupled between the input and the limit circuit to convert negative rectangular signals at the input to positive rectangular signals for the limit circuit.

3. The rectangular signal to phase signal converter as defined in claim 1, wherein the limit circuit includes circuitry to increase the values of input rectangular signals which are below the predetermined threshold to values above the predetermined threshold.

4. The rectangular signal to phase signal converter as defined in claim 1, wherein the input rectangular signals include pairs of coordinate signal, and wherein the limit circuit includes a detector, and wherein the limit circuit simultaneously increases each coordinate signal of each pair of coordinate signals until the detector detects that at least one of the coordinate signals of a pair of coordinate signals exceeds a threshold level.

5. The signal converter as defined in claim 4, wherein the limit circuit includes circuitry coupled to the input for doubling the level of each coordinate signal of a pair of coordinate signals which is below the threshold level.

6. The rectangular signal to phase signal converter according to claim 5, wherein the circuitry for doubling comprises shift registers, a respective shift register coupled to receive a respective coordinate signal of the pairs of coordinate signals.

7. The rectangular signal to phase signal converter as defined in claim 6, wherein the detector includes a detector circuit coupled to the shift registers to detect when the most significant bit in at least one of the shift registers is a logic one.

8. The rectangular signal to phase signal converter as defined in claim 2, wherein the phase selector uses adders and multipliers to generate phase information.

9. The rectangular signal to phase signal converter as defined in claim 2, wherein the phase selector uses the following equation to convert the rectangular limit signals output by the limit circuit to a phase signal:

$$\text{phase} = (\pi/4)(I-Q)(2-I-Q) + \pi/4;$$

wherein I is a limited in-phase coordinate signal and Q is a limited quadrature coordinate signal output from the limit circuit.

10. The rectangular signal to phase signal converter as defined in claim 4, wherein the input rectangular signal has L bits, and wherein the limit circuit extracts P of the L bits of each coordinate signal of the coordinate signal pairs.

11. The rectangular signal to phase signal converter as defined in claim 10, wherein P is greater than 1 and less than L.

12. The rectangular signal to phase signal converter as defined in claim 11, wherein the phase selector includes a ROM addressed by P-bit signals extracted by the limit circuit.

13. The rectangular signal to phase signal converter as defined in claim 2, wherein the phase selector includes a first selector to generate a relative phase signal and an original quadrant restorer.

14. A rectangular signal to phase signal converter comprising:
an input couple d to an RF signal source to receive an L-bit input rectangular signal pair, wherein L is the number of bits in each input rectangular signal;
a limit circuit coupled to the input for converting the L-bit input rectangular signal pair to a P-bit limited rectangular coordinate signal pair, wherein P is the number of bits in each limited rectangular coordinate signal and P is less than L;
a phase selector coupled to the limit circuit to convert the P-bit limited rectangular coordinate signal pair to an N-bit phase signal; and
an output coupled to the phase selector to output the phase signal.

15. The rectangular signal to phase signal converter as defined in claim 14, further including a quadrant converter coupled between the input and the limit circuit, the quadrant converter to convert negative rectangular signals to positive rectangular signals.

16. The rectangular signal to phase signal converter as defined in claim 14, wherein the limit circuit increases the values of input rectangular signals which are below a predetermined threshold.

17. The rectangular signal to phase signal converter as defined in claim 14, wherein the limit circuit includes circuitry for extracting P bits from coordinate signal pairs to provide limited coordinate signal pairs such that the most significant bit of at least one of the coordinate signals of a limited coordinate signal pair is a logic one.

18. The rectangular signal to phase signal converter as defined in claim 17, wherein the limit circuit includes shift registers which simultaneously double the level of extracted limited rectangular signals of an extracted rectangular signal pair when both extracted rectangular signals of the extracted rectangular signal pair are below the threshold level.

19. The rectangular signal to phase signal converter as defined in claim 18, wherein the limit circuit further includes a detector circuit coupled to the shift registers to detect when the most significant bit of at least one of the shift registers is a logic one.

20. The rectangular signal to phase signal converter as defined in claim 14, wherein the phase selector includes adders and multipliers to generate phase information from the extracted rectangular signal pairs.

21. The rectangular signal to phase signal converter as defined in claim 14, wherein the phase selector uses the following equation to convert the P-bit limited rectangular coordinate signal pair output by the limit circuit to a phase signal:

$$\text{phase} = (\pi/4)(I-Q)(2-I-Q) + \pi/4;$$

wherein I is the in-phase limited rectangular coordinate signal and Q is a quadrature limited rectangular coordinate signal.

22. The rectangular signal to phase signal converter as defined in claim 14, wherein P is greater than 1 and less than L.

23. The rectangular signal to phase signal converter as defined in claim 14, wherein the phase selector includes a ROM.

24. A method of converting rectangular signals to phase signals, comprising the steps of:
inputting L bit rectangular coordinate signal pair into a circuit;
selecting bits of the rectangular coordinate signals of the coordinate signal pair such that the most significant of the selected bits of at least one of the coordinate signals of the coordinate signal pair is a logic one, and outputting the selected bits as a limited rectangular coordinate signal pair;
selecting a phase in a phase selector as a function of the limited rectangular coordinate signal pair; and
outputting the selected phase signal.

25. The method as defined in claim 24, wherein the step of selecting selects P of the L bits in each rectangular coordinate signal of the coordinate signal pair, wherein P is less than L.

26. The method as defined in claim 25, wherein the step of selecting a phase includes adding and multiplying of bits of the limited coordinate rectangular signal pair.

27. The method as defined in claim 26, wherein the step of selecting includes subtracting of bits of the limited coordinate rectangular signal pair.

28. The method as defined in claim 27, further including the step of converting negative rectangular coordinate signals to positive rectangular coordinate signals before extracting the P-bit rectangular coordinate signal pair.

29. The method as defined in claim 28, further including the step of adjusting the selected phase according to the original positive and negative values of the rectangular coordinate signal pair.

30. A receiver comprising:
an input coupled to a source of RF signals;
a demodulator coupled to the input to receive RF signals therefrom and to output I and Q rectangular signal pairs;
a rectangular signal to phase signal converter coupled to the demodulator to convert the I and Q rectangular signal pairs to phase signals, the rectangular signal to phase signal converter comprising,
a limit circuit coupled to the demodulator to selectively convert I and Q rectangular signals output by the demodulator which are below a predetermined level to signal levels above the predetermined level, such that the magnitude of I and Q rectangular signals output by the limit circuit are above a minimal level; and a phase selector for converting the I and Q rectangular signals output by the second limit circuit into phase signals which are output by the rectangular signal to phase signal converter; and a signal processor coupled to the phase selector to process the phase signals and generating a receiver output signal responsive thereto.

31. The receiver as defined in claim 30, further including a quadrant converter coupled to the input to convert negative rectangular signals to positive rectangular signals, respectively, such that positive rectangular signals are output by the quadrant converter.

32. The receiver as defined in claim 31, wherein the first converter increases the values of input rectangular signals which are below the predetermined threshold level to values above the predetermined threshold level.

33. The receiver as defined in claim 32, wherein the limit circuit simultaneously increases each coordinate signal of the I and Q rectangular signal pairs until one coordinate signal the pair exceeds the threshold level.

34. The receiver as defined in claim 33, wherein the limit circuit includes shift registers receiving respective signals of the rectangular coordinate signal pairs, and the shift registers selectively simultaneously shift the contents thereof.

35. The receiver as defined in claim 34, further including a logic circuit coupled to the shift registers to detect when a most significant bit in at least one of the shift registers is a logic one.

36. The receiver as defined in claim 34, wherein the phase selector uses the following equation to convert the rectangular signals output by the second converter to phase signal:

$$\text{phase}=(\pi/4)(I-Q)(2-I-Q)+\pi/4;$$

wherein I is an in-phase coordinate signal and Q is a quadrature coordinate signal.

37. The receiver as defined in claim 30, wherein the coordinate signals of the I and Q coordinate signal pairs have L bits, and wherein the limit circuit outputs P of the L bits of each coordinate pair.

38. The receiver as defined in claim 37, wherein P is greater than 1 and less than L.

39. The receiver as defined in claim 30, wherein the phase selector includes a ROM addressed by the P-bit rectangular pair output from the limit circuit.

40. The receiver as defined in claim 31, wherein the phase converter includes a selector to generate a relative phase and an original quadrant restorer to convert the relative phase to the quadrant of the input rectangular signal.

* * * * *

UNITED STATES PATENT AND TRADEMARK OFFICE
CERTIFICATE OF CORRECTION

PATENT NO. : 5,844,943
DATED : December 1, 1998
INVENTOR(S) : Kazecki, Henry L. et al.

It is certified that error appears in the above-indentified patent and that said Letters Patent is hereby corrected as shown below:

Claim 4

In column 8, line 48, please replace "signal" with --signals--.

Claim 14

In column 9, line 29, please replace "couple d" with --coupled--.

Signed and Sealed this

Twenty-third Day of March, 1999

Attest:

Q. TODD DICKINSON

*Attesting Officer*  *Acting Commissioner of Patents and Trademarks*